United States Patent
Komiya

(10) Patent No.: US 10,208,137 B2
(45) Date of Patent: Feb. 19, 2019

(54) TIRE MEMBER MANUFACTURING METHOD AND TIRE MANUFACTURING METHOD

(71) Applicant: TOYO TIRE & RUBBER CO., LTD., Itami-shi, Hyogo (JP)

(72) Inventor: Yuki Komiya, Itami (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

(21) Appl. No.: 15/717,173

(22) Filed: Sep. 27, 2017

(65) Prior Publication Data
US 2018/0105614 A1 Apr. 19, 2018

(30) Foreign Application Priority Data
Oct. 14, 2016 (JP) .................. 2016-202824

(51) Int. Cl.
| | | |
|---|---|---|
| *C08F 6/22* | (2006.01) | |
| *C08J 3/215* | (2006.01) | |
| *C08K 3/04* | (2006.01) | |
| *C08K 5/20* | (2006.01) | |
| *C08C 1/14* | (2006.01) | |

(52) U.S. Cl.
CPC ............ *C08F 6/22* (2013.01); *C08C 1/14* (2013.01); *C08J 3/215* (2013.01); *C08K 3/04* (2013.01); *C08K 5/20* (2013.01); *C08J 2307/02* (2013.01)

(58) Field of Classification Search
CPC ....... B60C 1/00; C07C 233/44; C07C 235/28; C08K 5/125; C08K 5/18; C08K 5/20
See application file for complete search history.

(56) References Cited

U.S. PATENT DOCUMENTS

2014/0128532 A1    5/2014    Nakamura et al.

FOREIGN PATENT DOCUMENTS

JP    2014-95013 A    5/2014

*Primary Examiner* — Edward J Cain
(74) *Attorney, Agent, or Firm* — Westerman, Hattori, Daniels & Adrian, LLP

(57) ABSTRACT

A first tire member manufacturing method includes an operation in which a pre-coagulation rubber latex containing carbon black, for which a ratio of specific surface area as determined by nitrogen adsorption $N_2SA$ (in units of $m^2/g$) to an amount of iodine absorption IA (in units of mg/g) is not less than 1.00, is coagulated to obtain a coagulum; an operation in which a compound according to Formula (I), below, is added to the water-containing coagulum; and an operation in which the compound according to Formula (I), below, is dispersed within the coagulum.

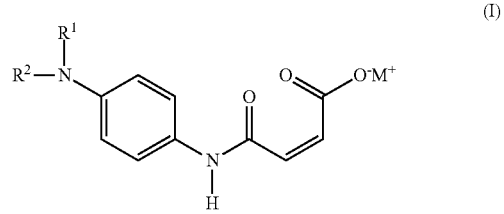

In Formula (I), $R^1$ and $R^2$ each indicates a hydrogen atom, an alkyl group having 1 to 20 carbons, an alkenyl group having 1 to 20 carbons, or an alkynyl group having 1 to 20 carbons, $R^1$ and $R^2$ may be the same or different, and $M^+$ indicates sodium ion, potassium ion, or lithium ion.

6 Claims, No Drawings

TIRE MEMBER MANUFACTURING METHOD AND TIRE MANUFACTURING METHOD

TECHNICAL FIELD

The present invention relates to a tire member manufacturing method and a tire manufacturing method.

BACKGROUND ART

Patent Reference No. 1 discloses a method in which (2Z)-4-[(4-aminophenyl)amino]-4-oxo-2-butene acid sodium and carbon black are placed in a Banbury mixer and kneaded with rubber (hereinafter "prior manufacturing method"). Regarding (2Z)-4-[(4-aminophenyl)amino]-4-oxo-2-butene acid sodium, Patent Reference No. 1 further discloses that the terminal nitrogen functional group bonds to carbon black and that the carbon-carbon double-bond portion bonds to polymer.

PRIOR ART REFERENCES

Patent References

PATENT REFERENCE NO. 1: Japanese Patent Application Publication Kokai No. 2014-95013

SUMMARY OF INVENTION

Means for Solving Problem

A first tire member manufacturing method in accordance with the present disclosure comprises an operation in which a pre-coagulation rubber latex containing carbon black, for which a ratio of specific surface area as determined by nitrogen adsorption $N_2SA$ (in units of $m^2/g$) to an amount of iodine absorption IA (in units of mg/g) is not less than 1.00, is coagulated to obtain a coagulum; an operation in which a compound according to Formula (I) (hereinafter "the compound according to Formula (I)"), below, is added to the water-containing coagulum; and an operation in which the compound according to Formula (I) is dispersed within the coagulum.

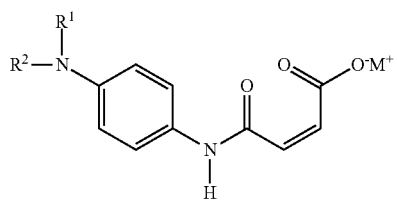

(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

A second tire member manufacturing method in accordance with the present disclosure comprises an operation in which a compound according to Formula (I) is added to a mixture comprising rubber and carbon black for which a ratio of specific surface area as determined by nitrogen adsorption $N_2SA$ (in units of $m^2/g$) to an amount of iodine absorption IA (in units of mg/g) is not less than 1.00; and an operation in which the compound according to Formula (I) is dispersed within the mixture in the presence of water.

EMBODIMENTS FOR CARRYING OUT INVENTION

Reflocculation of carbon black in unvulcanized rubber progresses as time goes on. Because reflocculation of carbon black may cause a change in properties, it is not preferred.

The present disclosure provides a tire member manufacturing method capable of inhibiting reflocculation of carbon black. The present disclosure provides a tire manufacturing method capable of inhibiting reflocculation of carbon black.

A first tire member manufacturing method comprises an operation in which a pre-coagulation rubber latex containing carbon black for which a ratio of $N_2SA$ (in units of $m^2/g$) to IA (in units of mg/g) is not less than 1.00 is coagulated to obtain a coagulum; an operation in which a compound according to Formula (I) is added to the water-containing coagulum; and an operation in which the compound according to Formula (I) is dispersed within the coagulum.

The first tire member manufacturing method permits inhibition of reflocculation of carbon black. This is thought to be due to the fact that because carbon black and the compound according to Formula (I) can be dispersed to a high degree, this makes it possible for the two to form bonds in effective fashion, and due to the fact that when in a state in which such bonds have been produced, it is possible to cause formation of bonds between the compound according to Formula (I) and polymer(s).

The first tire member manufacturing method permits a high degree of dispersal of carbon black. This is because the first tire member manufacturing method employs a procedure in which carbon-black-containing pre-coagulation rubber latex is coagulated to obtain a coagulum.

The first tire member manufacturing method permits a high degree of dispersal of the compound according to Formula (I). Because the compound according to Formula (I) is hydrophilic and because rubber in its dried state is hydrophobic, the compound according to Formula (I) tends not to be easily dispersed by the prior manufacturing method. In contrast, with the first tire member manufacturing method, the water content of the coagulum may facilitate dispersal of the compound according to Formula (I). The first tire member manufacturing method therefore permits more improvement in the dispersion characteristics of the compound according to Formula (I) than the prior manufacturing method.

Moreover, because the first tire member manufacturing method employs carbon black for which $N_2SA/IA$ is not less than 1.00, it has greater effect in inhibiting reflocculation of carbon black than would be the case were carbon black for which $N_2SA/IA$ is below 1.00 employed.

At the first tire member manufacturing method, it is preferred that the operation in which the compound according to Formula (I) is dispersed within the coagulum be an operation in which the compound according to Formula (I) is dispersed within the coagulum as the coagulum is being dewatered.

At the first tire member manufacturing method, at the operation in which the compound according to Formula (I) is added to the coagulum, taking the amount of water in the coagulum for every 100 parts by mass of rubber within the coagulum to be Wa, and taking the amount of compound according to Formula (I) that is added for every 100 parts by mass of rubber within the coagulum to be Wb, it is preferred that the ratio of Wa to Wb (i.e., Wa/Wb) be in the range 1 to 8100.

A first tire manufacturing method may comprise the first tire member manufacturing method.

A second tire member manufacturing method comprises an operation in which a compound according to Formula (I) is added to a mixture comprising rubber and carbon black for which a ratio of $N_2SA$ (in units of $m^2/g$) to IA (in units of mg/g) is not less than 1.00; and an operation in which the compound according to Formula (I) is dispersed within the mixture in the presence of water.

The second tire member manufacturing method permits inhibition of reflocculation of carbon black. This is thought to be due to the fact that because carbon black and the compound according to Formula (I) can be dispersed to a high degree, this makes it possible for the two to form bonds in effective fashion, and due to the fact that when in a state in which such bonds have been produced, it is possible to cause formation of bonds between the compound according to Formula (I) and polymer(s).

A second tire manufacturing method may comprise the second tire member manufacturing method.

A tire member manufacturing method in accordance with a first embodiment comprises an operation in which rubber latex and carbon black for which $N_2SA/IA$ is not less than 1.00 are mixed to obtain a carbon black slurry. Mixing the carbon black and the rubber latex makes it is possible to prevent reflocculation of carbon black. This is thought to be due to formation of an extremely thin latex phase on all or part of the surface of the carbon black, the latex phase inhibiting reflocculation of carbon black. $N_2SA/IA$ is an indicator of the surface activity of carbon black. It is preferred that $N_2SA/IA$ of the carbon black be not less than 1.10, and more preferred that this be not less than 1.25. Because this is not less than 1.00, reactivity with the compound according to Formula (I) is good. The upper limit of the range in values for $N_2SA/IA$ might, for example, be 2.0, it being preferred that this be 1.5. It is preferred that $N_2SA$ of the carbon black be not less than 100 $m^2/g$. The upper limit of the range in values for $N_2SA$ might, for example, be 200 $m^2/g$, it being preferred that this be 180 $m^2/g$, and more preferred that this be 160 $m^2/g$. $N_2SA$ is the value as measured in accordance with ASTM D3037. It is preferred that IA of the carbon black be not less than 50 mg/g, more preferred that this be not less than 60 mg/g, and still more preferred that this be not less than 70 mg/g. The upper limit of the range in values for IA might, for example, be 150 mg/g, it being preferred that this be 130 mg/g. IA is the value as measured in accordance with ASTM D1510. The carbon black is such that the full width at half maximum ΔDst of the Stokes mode diameter divided by the Stokes mode diameter Dst exhibits an aggregate distribution. It is preferred that ΔDst/Dst of the carbon black be in the range 0.2 to 0.9. When this is in the range 0.2 to 0.9, it will be possible to obtain a well-balanced tread. The following method may be used to measure Dst and ΔDst. Mix dried carbon black with a 20 vol % aqueous solution of ethanol containing a small amount of surface active agent to prepare a liquid dispersion having a carbon black concentration of 50 mg/l, this being sufficiently dispersed therein by ultrasonic means. Adjust a disc centrifuge device for a rotational velocity of 8000 rpm, add thereto 10 ml of spin solution comprising a 1 wt % aqueous solution of glycerin, thereafter pour thereinto 1 ml of buffer solution comprising a 20 vol % aqueous solution of ethanol, further add thereto 0.5 ml of carbon black liquid dispersion, initiate centrifugal sedimentation, optically prepare a carbon black aggregate Stokes diameter distribution curve, take the Stokes diameter for which frequency on the distribution curve is a maximum to be Dst (nm), and take the difference between the Stokes diameters of the two points of differing magnitude whose frequencies are 50% of the maximum frequency to be ΔDst (nm). The rubber latex at the operation in which the carbon black slurry is made may for example be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that solids (rubber) concentration in the rubber latex be not less than 0.1 mass %, more preferred that this be not less than 0.2 mass %, and still more preferred that this be not less than 0.3 mass %. The upper limit of the range in values for the solids concentration might, for example, be 5 mass %, it being preferred that this be 2 mass %, and it being more preferred that this be 1 mass %. The carbon black and the rubber latex may be mixed using a high-shear mixer, high shear mixer, homomixer, ball mill, bead mill, high-pressure homogenizer, ultrasonic homogenizer, colloid mill, and/or other such ordinary disperser.

At the carbon black slurry, carbon black for which $N_2SA/IA$ is not less than 1.00 is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %.

The tire member manufacturing method in accordance with the first embodiment further comprises an operation in which the carbon black slurry and rubber latex are mixed to obtain pre-coagulation rubber latex. The rubber latex for mixture with the carbon black slurry may for example be natural rubber latex, synthetic rubber latex, and/or the like. It is preferred that the solids concentration of the rubber latex for mixture with the carbon black slurry be greater than the solids concentration of the rubber latex at the operation in which the carbon black slurry is made. It is preferred that the solids concentration of the rubber latex for mixture with the carbon black slurry be not less than 10 mass %, and more preferred that this be not less than 20 mass %. The upper limit of the range in values for the solids concentration at the rubber latex might, for example, be 60 mass %, it being preferred that this be 40 mass %, and it being more preferred that this be 30 mass %. The carbon black slurry and the rubber latex may be mixed using a high-shear mixer, high shear mixer, homomixer, ball mill, bead mill, high-pressure homogenizer, ultrasonic homogenizer, colloid mill, and/or other such ordinary disperser.

At the pre-coagulation rubber latex, rubber particles, carbon black for which $N_2SA/IA$ is not less than 1.00, and so forth are dispersed in water. It is preferred that the amount of the carbon black be 10 parts by mass to 70 parts by mass for every 100 parts by mass of solids (rubber) in the rubber latex.

The tire member manufacturing method in accordance with the first embodiment further comprises an operation in which the pre-coagulation rubber latex is coagulated to obtain a coagulum. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water.

The tire member manufacturing method in accordance with the first embodiment further comprises an operation in which a compound according to Formula (I) is added to the coagulum. At the operation in which the compound according to Formula (I) is added, the amount Wa of water in the coagulum might, for example, be not less than 1 part by mass, it being preferred that this be not less than 10 parts by mass, for every 100 parts by mass of rubber within the coagulum. The upper limit of the range in values for Wa might, for example, be 800 parts by mass, it being preferred that this be 600 parts by mass. The amount Wb of compound according to Formula (I) that is added might, for example, be not less than 0.1 part by mass, it being preferred that this be not less than 0.5 part by mass, for every 100 parts by mass of rubber within the coagulum. The upper limit of the range in values for Wb might, for example, be 10 parts by mass, it being preferred that this be 5 parts by mass. It is preferred that the ratio of Wa to Wb (i.e., Wa/Wb) be in the range 1 to 8100. Causing Wa/Wb to be less than 1 would be unlikely to produce much benefit in terms of inhibiting reflocculation of carbon black. Above 8100, it might be the case that the water content of the coagulum will remain in the master batch.

Formula (I) is indicated below.

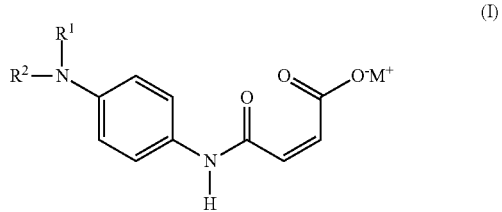

(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

At Formula (I), it is preferred that $R^1$ and $R^2$ each be a hydrogen atom. It is preferred that $M^+$ be a sodium ion. It is preferred that the compound according to Formula (I) be a compound according to Formula (I'), below.

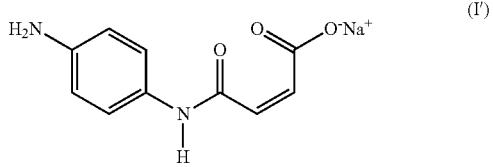

(I')

The tire member manufacturing method in accordance with the first embodiment further comprises an operation in which the compound according to Formula (I) is dispersed within the coagulum. The operation in which the compound according to Formula (I) is dispersed within the coagulum might, for example, be an operation in which the compound according to Formula (I) is dispersed within the coagulum as the post-addition-of-compound-according-to-Formula-(I) coagulum is being dewatered; more specifically, this might be an operation in which the compound according to Formula (I) is dispersed within the coagulum as a shear force is imparted at 100° C. to 250° C. to the post-addition-of-compound-according-to-Formula-(I) coagulum. It is preferred that the lower limit of the range in values for temperature be 120° C. It is preferred that the upper limit of the range in values for temperature be 230° C. A single screw extruder or other such extruder may be used for dispersing the compound according to Formula (I) within the coagulum.

The tire member manufacturing method in accordance with the first embodiment further comprises an operation in which, following dispersal of the compound according to Formula (I), drying and plasticization of the coagulum are carried out to obtain a master batch.

The master batch comprises rubber. The rubber might, for example, be natural rubber, isoprene rubber, butadiene rubber, styrene-butadiene rubber, nitrile rubber, chloroprene rubber, and/or the like. It is preferred that the amount of natural rubber in the master batch be not less than 70 mass %, more preferred that this be not less than 80 mass %, still more preferred that this be not less than 90 mass %, and still more preferred that this be 100 mass %, per 100 mass % of the rubber.

The tire member manufacturing method in accordance with the first embodiment further comprises an operation in which master batch and compounding ingredient(s)—and, where necessary, rubber not originating from the master batch—are dry-blended in a mixer to obtain a mixture. As rubber not originating from the master batch, natural rubber, isoprene rubber, butadiene rubber, styrene-butadiene rubber, nitrile rubber, chloroprene rubber, and the like may be cited as examples. The compounding ingredient(s) might, for example, be stearic acid, wax, zinc oxide, antioxidant, and/or the like. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. As the mixer, internal mixers, open roll mills, and the like may be cited as examples. As an internal mixer, Banbury mixers, kneaders, and the like may be cited as examples.

The tire member manufacturing method in accordance with the first embodiment further comprises an operation in which a vulcanizing-type compounding ingredient is added to the mixture, and in which the vulcanizing-type compounding ingredient is kneaded into the mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispersing sulfur, and the like may be cited as examples. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises a rubber component that comprises natural rubber. It is preferred that the amount of natural rubber be not less than 40 mass %, and more preferred that this be not less than 50 mass %, per 100 mass % of the rubber component. The upper limit of the range in values for the amount of natural rubber might, for example, be 100 mass %, 90 mass %, or the like.

The rubber composition may further comprise butadiene rubber. The amount of the butadiene rubber might, for example, be not less than 5 mass % per 100 mass % of the rubber component. The upper limit of the range in values for the amount of the butadiene rubber might, for example, be 50 mass %, it being preferred that this be 40 mass % or the like.

The rubber composition further comprises carbon black for which $N_2SA/IA$ is not less than 1.00. It is preferred that the amount of the carbon black be 10 parts by mass to 70 parts by mass for every 100 parts by mass of the rubber component.

The rubber composition further comprises a compound according to Formula (I). For every 100 parts by mass of the rubber component, it is preferred that the amount of the compound according to Formula (I) be not less than 0.1 part by mass, and more preferred that this be not less than 0.5 part by mass. For every 100 parts by mass of the rubber component, it is preferred that the amount of the compound according to Formula (I) be not greater than 10 parts by mass, and more preferred that this be not greater than 8 parts by mass.

The rubber composition may further comprise stearic acid, wax, zinc oxide, antioxidant, sulfur, vulcanization accelerator, and/or the like. It is preferred that the amount of the sulfur, expressed as equivalent sulfur content, be 0.5 part by mass to 5 parts by mass for every 100 parts by mass of the rubber component. It is preferred that the amount of the vulcanization accelerator be 0.1 part by mass to 5 parts by mass for every 100 parts by mass of the rubber component.

It is preferred that the rubber composition be employed in tire member(s), and more preferred that it be employed in tread(s).

A tire manufacturing method in accordance with the first embodiment comprises an operation in which a green tire equipped with a tire member made up of the rubber composition is made. As the tire member, a tread may be cited as an example. The tire manufacturing method in accordance with the first embodiment further comprises an operation in which the green tire is heated. The tire obtained by the method of the first embodiment may be a pneumatic tire.

A variation on the first embodiment will now be described. Whereas the tire member manufacturing method in accordance with the first embodiment comprised an operation in which rubber latex and carbon black for which $N_2SA/IA$ was not less than 1.00 were mixed to obtain a carbon black slurry, a variation on the first embodiment comprises, instead of that operation, an operation in which water and carbon black for which $N_2SA/IA$ is not less than 1.00 are mixed to obtain a carbon black slurry.

A tire member manufacturing method in accordance with a second embodiment comprises an operation in which a compound according to Formula (I) is added to a mixture comprising carbon black for which $N_2SA/IA$ is not less than 1.00 and rubber. For every 100 parts by mass of the rubber, it is preferred that the amount of carbon black in the mixture be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass. The rubber might, for example, be natural rubber, isoprene rubber, butadiene rubber, styrene-butadiene rubber, nitrile rubber, chloroprene rubber, and/or the like. It is preferred that the amount of natural rubber in the mixture be not less than 70 mass %, more preferred that this be not less than 80 mass %, still more preferred that this be not less than 90 mass %, and still more preferred that this be 100 mass %, per 100 mass % of the rubber. The amount of the compound according to Formula (I) that is added might, for example, be 0.1 part by mass to 10 parts by mass for every 100 parts by mass of rubber within the mixture.

The tire member manufacturing method in accordance with the second embodiment further comprises an operation in which the compound according to Formula (I) is dispersed within the mixture in the presence of water to obtain a master batch. The amount of water in the mixture might, for example, be not less than 1 part by mass, it being preferred that this be not less than 10 parts by mass, for every 100 parts by mass of rubber within the mixture. The upper limit of the range in values for the amount of water in the mixture might, for example, be 800 parts by mass, it being preferred that this be 600 parts by mass. Regarding the master batch, the description given at the first embodiment is incorporated here.

The tire member manufacturing method in accordance with the second embodiment further comprises an operation in which master batch and compounding ingredient(s)—and, where necessary, rubber not originating from the master batch—are dry-blended in a mixer to obtain a pre-addition-of-vulcanizing-type-compounding-ingredient mixture. Regarding this, the description given at the first embodiment is incorporated here.

The tire member manufacturing method in accordance with the second embodiment further comprises an operation in which a vulcanizing-type compounding ingredient is added to the pre-addition-of-vulcanizing-type-compounding-ingredient mixture, and in which the vulcanizing-type compounding ingredient is kneaded into the pre-addition-of-vulcanizing-type-compounding-ingredient mixture to obtain a rubber composition. Regarding this, the description given at the first embodiment is incorporated here.

A tire manufacturing method in accordance with the second embodiment comprises an operation in which a green tire equipped with a tire member made up of the rubber composition is made. As the tire member, a tread may be cited as an example. The tire manufacturing method in accordance with the second embodiment further comprises an operation in which the green tire is heated. The tire obtained by the method of the second embodiment may be a pneumatic tire.

WORKING EXAMPLES

Working examples in accordance with the present disclosure are described below.

Raw materials and reagents are indicated below.

| | |
|---|---|
| Natural rubber latex (dry rubber content = 31.2%) | Manufactured by Golden Hope |
| Coagulant | Formic acid (reagent-grade 85%) manufactured by Nacalai Tesque, Inc. (diluted to obtain 10% solution and pH adjusted to 1.2 prior to use) |
| Carbon Black 1 | "N110" (ASTM-grade N110; $N_2SA = 127$ m$^2$/g; IA = 145 mg/g; $N_2SA/IA = 0.88$) manufactured by Phillips Carbon |
| Carbon Black 2 | "VULCAN 9" (ASTM-grade N115; $N_2SA = 123$ m$^2$/g; IA = 160 mg/g; $N_2SA/IA = 0.77$) manufactured by Cabot Corporation |
| Carbon Black 3 | "N121" (ASTM-grade N121; $N_2SA = 122$ m$^2$/g; IA = 121 mg/g; $N_2SA/IA = 1.01$) manufactured by CSRC |

-continued

| | |
|---|---|
| Carbon Black 4 | "SEAST 9H" (ASTM-grade N134; $N_2SA$ = 142 $m^2$/g; IA = 139 mg/g; $N_2SA$/IA = 1.02) manufactured by Tokai Carbon Co., Ltd. |
| Compound 1 | (2Z)-4-[(4-aminophenyl)amino]-4-oxo-2-butene acid sodium (compound according to Formula (I')) manufactured by Sumitomo Chemical Co., Ltd. |
| Natural rubber | RSS #3 |
| Polybutadiene rubber | "BR150B" manufactured by Ube Industries, Ltd. |
| Zinc oxide | "Zinc Oxide No. 1" manufactured by Mitsui Mining |
| Stearic acid | "LUNAC S-20" manufactured by Kao Corporation |
| Wax | "OZOACE 0355" manufactured by Nippon Seiro Co., Ltd. |
| Antioxidant | "6PPD" (N-phenyl-N'-(1,3-dimethylbutyl)-p-phenylenediamine) manufactured by Monsanto Company |
| Sulfur | "5% Oil Treated Sulfur Powder" manufactured by Tsurumi Chemical Industry Co., Ltd. |
| Vulcanization accelerator | "Sanceler NS-G" (N-(tert-butyl)-2-benzothiazolesulfenamide) manufactured by Sanshin Chemical Industry Co., Ltd. |

Preparation of Wet Master Batch at Working Examples 1 Through 12 and at Comparative Examples 7, 8, 19, and 20

Water was added at 25° C. to concentrated natural rubber latex to obtain a dilute natural rubber latex having a solids (rubber) concentration that was 0.52 mass %, and a natural rubber latex having a solids (rubber) concentration that was 28 mass %. 50 parts by mass of carbon black was added to 954.8 parts by mass of the dilute natural rubber latex, and a ROBO MIX manufactured by PRIMIX Corporation was used to agitate the post-addition-of-carbon-black dilute natural rubber latex to obtain a carbon black/natural rubber slurry. The carbon black/natural rubber slurry was added to the natural rubber latex having the solids (rubber) concentration that was 28 mass % in accordance with TABLE 1, and a mixer for household use manufactured by SANYO was used to agitate the post-addition-of-carbon-black/natural-rubber-slurry natural rubber latex at 11300 rpm for 30 min to obtain a pre-coagulation rubber latex. Formic acid serving as coagulant was added to the pre-coagulation rubber latex in an amount sufficient to achieve a pH of 4, and a filter was used to separate the coagulum from waste liquid. Compound 1 was added to the coagulum, and Compound 1 was dispersed within the coagulum as a Model V-02 screw press (squeezer-type single-screw dewatering extruder) manufactured by Suehiro EPM Corporation was used to dewater/plasticize at 180° C. the post-addition-of-Compound-1 coagulum. As a result of the foregoing procedure, a wet master batch was obtained.

Preparation of Wet Master Batch at Comparative Examples 9 Through 12 and Comparative Examples 21 Through 24

Except for the fact that Compound 1 was not added to the coagulum, a procedure identical to that of Working Example 1 was used to obtain a wet master batch.

Preparation of Wet Master Batch at Comparative Examples 2, 5, 14, and 17

Except for the fact that the coagulum was substantially completely dewatered prior to addition of the Compound 1 to the coagulum, a procedure identical to that of Working Example 1 was used to prepare a wet master batch.

Preparation of Dry Master Batch at Comparative Examples 1, 3, 4, 6, 13, 15, 16, and 18

The compounding ingredient(s) were blended therewithin in accordance with TABLE 1 and were kneaded to obtain a dry master batch.

Preparation of Unvulcanized Rubber at the Various Examples

The compounding ingredients except for sulfur and vulcanization accelerator were added in accordance with TABLE 1, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Inhibition of Reflocculation

The unvulcanized rubber was vulcanized at 160° C. for 30 min, and an RPA2000 manufactured by Alpha Technologies was used to measure shear force of the vulcanized rubber when strain was varied from 0.5% to 45% under conditions of temperature 60° C. and frequency 1.667 Hz to determine the value of the difference between the maximum shear force and the minimum shear force (measurement of Payne effect). Shear force after the unvulcanized rubber had been stored for 3 months at 23° C.±2° C. was also measured to determine the value of the difference between maximum shear force and minimum shear force. The value following storage is shown as indexed relative to a value of 100 for the value prior to storage. The lower the index the greater the inhibition of reflocculation of carbon black.

TABLE 1

| | | | Working Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Manufacture WMB | Parts by mass | Natural rubber (solids content) | 100 | 100 | 100 | 100 | 100 | 100 | 80 | 80 | 80 | 80 | 80 | 80 |
| | | Carbon Black 1 | — | — | — | — | — | — | — | — | — | — | — | — |
| | | Carbon Black 2 | — | — | — | — | — | — | — | — | — | — | — | — |
| | | Carbon Black 3 | 45 | 45 | 45 | — | — | — | 45 | 45 | 45 | — | — | — |
| | | Carbon Black 4 | — | — | — | 45 | 45 | 45 | — | — | — | 45 | 45 | 45 |
| | | Compound 1 | 2 | 2 | 2 | 2 | 2 | 2 | 2 | 2 | 2 | 2 | 2 | 2 |
| | | Water content (parts by mass) of coagulum at time of addition of Compound 1 | 200 | 4 | 10000 | 200 | 4 | 10000 | 200 | 4 | 10000 | 200 | 4 | 10000 |
| | | Wa/Wb | 100 | 2 | 5000 | 100 | 2 | 5000 | 100 | 2 | 5000 | 100 | 2 | 5000 |

TABLE 1-continued

|  |  |  | Working Example |  |  |  |  |  |  |  |  |  |  |  |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
| Manufacture DMB | Parts by mass | Natural rubber (RSS #3) | — | — | — | — | — | — | — | — | — | — | — | — |
|  |  | Carbon Black 3 | — | — | — | — | — | — | — | — | — | — | — | — |
|  |  | Carbon Black 4 | — | — | — | — | — | — | — | — | — | — | — | — |
| Manufacture unvulcanized rubber | Parts by mass | WMB | 147 | 147 | 147 | 147 | 147 | 147 | 127 | 127 | 127 | 127 | 127 | 127 |
|  |  | DMB | — | — | — | — | — | — | — | — | — | — | — | — |
|  |  | Polybutadiene rubber | — | — | — | — | — | — | 20 | 20 | 20 | 20 | 20 | 20 |
|  |  | Compound 1 | — | — | — | — | — | — | — | — | — | — | — | — |
|  |  | Zinc oxide | 3 | 3 | 3 | 3 | 3 | 3 | 3 | 3 | 3 | 3 | 3 | 3 |
|  |  | Stearic acid | 2 | 2 | 2 | 2 | 2 | 2 | 2 | 2 | 2 | 2 | 2 | 2 |
|  |  | Wax | 2 | 2 | 2 | 2 | 2 | 2 | 2 | 2 | 2 | 2 | 2 | 2 |
|  |  | Antioxidant | 2 | 2 | 2 | 2 | 2 | 2 | 2 | 2 | 2 | 2 | 2 | 2 |
|  |  | Sulfur | 1.5 | 1.5 | 1.5 | 1.5 | 1.5 | 1.5 | 1.5 | 1.5 | 1.5 | 1.5 | 1.5 | 1.5 |
|  |  | Vulcanization accelerator | 0.5 | 0.5 | 0.5 | 0.5 | 0.5 | 0.5 | 0.5 | 0.5 | 0.5 | 0.5 | 0.5 | 0.5 |
| Inhibition of reflocculation |  |  | 105 | 107 | 104 | 107 | 107 | 105 | 103 | 105 | 103 | 105 | 107 | 106 |

TABLE 2

|  |  |  | Comparative Example |  |  |  |  |  |  |  |  |  |  |  |
|---|---|---|---|---|---|---|---|---|---|---|---|---|---|---|
|  |  |  | 1 | 2 | 3 | 4 | 5 | 6 | 7 | 8 | 9 | 10 | 11 | 12 |
| Manufacture WMB | Parts by mass | Natural rubber (solids content) | — | 100 | — | — | 100 | — | 100 | 100 | 100 | 100 | 100 | 100 |
|  |  | Carbon Black 1 | — | — | — | — | — | — | 45 | — | — | — | — | — |
|  |  | Carbon Black 2 | — | — | — | — | — | — | — | 45 | — | — | — | — |
|  |  | Carbon Black 3 | — | 45 | — | — | — | — | — | — | 45 | 45 | — | — |
|  |  | Carbon Black 4 | — | — | — | — | 45 | — | — | — | — | — | 45 | 45 |
|  |  | Compound 1 | — | 2 | — | — | 2 | — | 2 | 2 | — | — | — | — |
|  | Water content (parts by mass) of coagulum at time of addition of Compound 1 |  | — | — | — | — | — | — | 200 | 200 | 200 | 200 | 200 | 200 |
|  |  | Wa/Wb | — | — | — | — | — | — | 100 | 100 | — | — | — | — |
| Manufacture DMB | Parts by mass | Natural rubber (RSS #3) | 100 | — | 100 | 100 | — | 100 | — | — | — | — | — | — |
|  |  | Carbon Black 3 | 45 | — | 45 | — | — | — | — | — | — | — | — | — |
|  |  | Carbon Black 4 | — | — | — | 45 | — | 45 | — | — | — | — | — | — |
| Manufacture unvulcanized rubber | Parts by mass | WMB | — | 147 | — | — | 147 | — | 147 | 147 | 145 | 145 | 145 | 145 |
|  |  | DMB | 145 | — | 145 | 145 | — | 145 | — | — | — | — | — | — |
|  |  | Polybutadiene rubber | — | — | — | — | — | — | — | — | — | — | — | — |
|  |  | Compound 1 | — | — | 2 | — | — | 2 | — | — | 2 | — | — | 2 |
|  |  | Zinc oxide | 3 | 3 | 3 | 3 | 3 | 3 | 3 | 3 | 3 | 3 | 3 | 3 |
|  |  | Stearic acid | 2 | 2 | 2 | 2 | 2 | 2 | 2 | 2 | 2 | 2 | 2 | 2 |
|  |  | Wax | 2 | 2 | 2 | 2 | 2 | 2 | 2 | 2 | 2 | 2 | 2 | 2 |
|  |  | Antioxidant | 2 | 2 | 2 | 2 | 2 | 2 | 2 | 2 | 2 | 2 | 2 | 2 |
|  |  | Sulfur | 1.5 | 1.5 | 1.5 | 1.5 | 1.5 | 1.5 | 1.5 | 1.5 | 1.5 | 1.5 | 1.5 | 1.5 |
|  |  | Vulcanization accelerator | 0.5 | 0.5 | 0.5 | 0.5 | 0.5 | 0.5 | 0.5 | 0.5 | 0.5 | 0.5 | 0.5 | 0.5 |
| Inhibition of reflocculation |  |  | 123 | 120 | 122 | 134 | 130 | 131 | 115 | 114 | 124 | 120 | 132 | 132 |

TABLE 3

|  |  |  | Comparative Example |  |  |  |  |  |  |  |  |  |  |  |
|---|---|---|---|---|---|---|---|---|---|---|---|---|---|---|
|  |  |  | 13 | 14 | 15 | 16 | 17 | 18 | 19 | 20 | 21 | 22 | 23 | 24 |
| Manufacture WMB | Parts by mass | Natural rubber (solids content) | — | 80 | — | — | 80 | — | 80 | 80 | 80 | 80 | 80 | 80 |
|  |  | Carbon Black 1 | — | — | — | — | — | — | 45 | — | — | — | — | — |
|  |  | Carbon Black 2 | — | — | — | — | — | — | — | 45 | — | — | — | — |
|  |  | Carbon Black 3 | — | 45 | — | — | — | — | — | — | 45 | 45 | — | — |
|  |  | Carbon Black 4 | — | — | — | 45 | — | — | — | — | — | — | 45 | 45 |
|  |  | Compound 1 | — | 2 | — | — | 2 | — | 2 | 2 | — | — | — | — |

TABLE 3-continued

| | | | Comparative Example | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 | 24 |
| | | Water content (parts by mass) of coagulum at time of addition of Compound 1 | — | — | — | — | — | — | 200 | 200 | 200 | 200 | 200 | 200 |
| | | Wa/Wb | — | — | — | — | — | — | 100 | 100 | — | — | — | — |
| Manufacture DMB | Parts by mass | Natural rubber (RSS #3) | 80 | — | 80 | 80 | — | 80 | — | — | — | — | — | — |
| | | Carbon Black 3 | 45 | — | 45 | — | — | — | — | — | — | — | — | — |
| | | Carbon Black 4 | — | — | — | 45 | — | 45 | — | — | — | — | — | — |
| Manufacture unvulcanized rubber | Parts by mass | WMB | — | 127 | — | — | 127 | — | 127 | 127 | 125 | 125 | 125 | 125 |
| | | DMB | 125 | — | 125 | 125 | — | 125 | — | — | — | — | — | — |
| | | Polybutadiene rubber | 20 | 20 | 20 | 20 | 20 | 20 | 20 | 20 | 20 | 20 | 20 | 20 |
| | | Compound 1 | — | — | 2 | — | — | 2 | — | — | — | 2 | — | 2 |
| | | Zinc oxide | 3 | 3 | 3 | 3 | 3 | 3 | 3 | 3 | 3 | 3 | 3 | 3 |
| | | Stearic acid | 2 | 2 | 2 | 2 | 2 | 2 | 2 | 2 | 2 | 2 | 2 | 2 |
| | | Wax | 2 | 2 | 2 | 2 | 2 | 2 | 2 | 2 | 2 | 2 | 2 | 2 |
| | | Antioxidant | 2 | 2 | 2 | 2 | 2 | 2 | 2 | 2 | 2 | 2 | 2 | 2 |
| | | Sulfur | 1.5 | 1.5 | 1.5 | 1.5 | 1.5 | 1.5 | 1.5 | 1.5 | 1.5 | 1.5 | 1.5 | 1.5 |
| | | Vulcanization accelerator | 0.5 | 0.5 | 0.5 | 0.5 | 0.5 | 0.5 | 0.5 | 0.5 | 0.5 | 0.5 | 0.5 | 0.5 |
| Inhibition of reflocculation | | | 118 | 116 | 117 | 129 | 126 | 123 | 113 | 117 | 120 | 118 | 126 | 124 |

Addition of the compound according to Formula (I) at the stage of the water-containing coagulum was effective in inhibiting reflocculation of carbon black. For example, addition of 2 parts by mass of the compound according to Formula (I) at the stage of the water-containing coagulum caused improvement in an amount corresponding to 19 points (see Working Example 1 and Comparative Example 9). On the other hand, addition of the compound according to Formula (I) during kneading at the Banbury mixer caused improvement in an amount corresponding to a mere 4 points (see Comparative Example 9 and Comparative Example 10). Addition of the compound according to Formula (I) after dewatering had been completely carried out caused improvement in an amount corresponding to a mere 4 points (see Comparative Example 9 and Comparative Example 2).

Addition of the compound according to Formula (I) at the stage of the water-containing coagulum was effective in inhibiting reflocculation when the carbon black that was added to the rubber had high $N_2SA/IA$. Reflocculation tended to proceed to less degree when Carbon Black 3 or Carbon Black 4 was blended therein than it did when Carbon Black 1 or Carbon Black 2 was blended therein (see Working Example 1, Working Example 4, Comparative Example 7, and Comparative Example 8).

The invention claimed is:

1. A tire member manufacturing method comprising:
    an operation in which a pre-coagulation rubber latex, that contains carbon black for which a ratio of specific surface area in units of $m^2/g$ as determined by nitrogen adsorption to an amount of iodine absorption in units of mg/g is not less than 1.00, is coagulated to obtain a coagulum;
    an operation in which a compound according to Formula (I), below, is added to the water-containing coagulum; and
    an operation in which the compound is dispersed within the coagulum;

wherein Formula (I) is given by

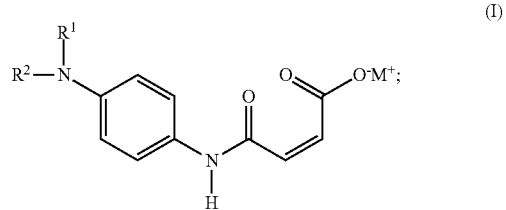

and
    wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;
    $R^1$ and $R^2$ may be the same or different; and
    $M^+$ indicates sodium ion, potassium ion, or lithium ion.

2. The tire member manufacturing method according to claim 1 wherein
    the operation in which the compound is dispersed within the coagulum is an operation in which the compound is dispersed within the coagulum as the coagulum is being dewatered.

3. The tire member manufacturing method according to claim 1 wherein,
    at the operation in which the compound is added to the coagulum, taking the amount of water in the coagulum for every 100 parts by mass of rubber within the coagulum to be Wa, and taking the amount of the compound that is added for every 100 parts by mass of rubber within the coagulum to be Wb, Wa/Wb, being the ratio of Wa to Wb, is in a range that is 1 to 8100.

4. A tire manufacturing method comprising the tire member manufacturing method according to claim 1.

5. A tire member manufacturing method comprising:
    an operation in which a compound according to Formula (I), below, is added to a mixture comprising rubber and carbon black for which a ratio of specific surface area in units of $m^2/g$ as determined by nitrogen adsorption to an amount of iodine absorption in units of mg/g is not less than 1.00; and an operation in which the compound is dispersed within the mixture in the presence of water,
wherein Formula (I) is given by

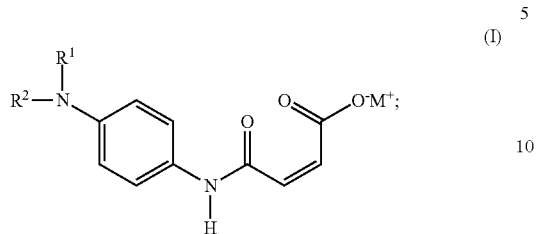

(I)

and
wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;
$R^1$ and $R^2$ may be the same or different; and
$M^+$ indicates sodium ion, potassium ion, or lithium ion.

6. A tire manufacturing method comprising the tire member manufacturing method according to claim 5.

* * * * *